United States Patent
Li et al.

(10) Patent No.: US 11,907,821 B2
(45) Date of Patent: Feb. 20, 2024

(54) POPULATION-BASED TRAINING OF MACHINE LEARNING MODELS

(71) Applicant: DeepMind Technologies Limited, London (GB)

(72) Inventors: Ang Li, Cupertino, CA (US); Valentin Clement Dalibard, London (GB); David Budden, London (GB); Ola Spyra, Mountain View, CA (US); Maxwell Elliot Jaderberg, London (GB); Timothy James Alexander Harley, London (GB); Sagi Perel, Pittsburgh, PA (US); Chenjie Gu, Mountain View, CA (US); Pramod Gupta, Mountain View, CA (US)

(73) Assignee: DeepMind Technologies Limited, London (GB)

( * ) Notice: Subject to any disclaimer, the term of this patent is extended or adjusted under 35 U.S.C. 154(b) by 760 days.

(21) Appl. No.: 16/586,236

(22) Filed: Sep. 27, 2019

(65) Prior Publication Data
US 2021/0097443 A1  Apr. 1, 2021

(51) Int. Cl.
*G06N 20/20* (2019.01)
*G06F 16/901* (2019.01)
*G06N 5/04* (2023.01)

(52) U.S. Cl.
CPC ......... *G06N 20/20* (2019.01); *G06F 16/9024* (2019.01); *G06N 5/04* (2013.01)

(58) Field of Classification Search
CPC ... G06Q 10/20; G06F 16/285; G06F 16/9024; G07C 5/00; G06N 20/20; G06N 5/04
See application file for complete search history.

(56) References Cited

U.S. PATENT DOCUMENTS

| 6,523,016 B1 | 2/2003 | Michalski |
| 2017/0132528 A1* | 5/2017 | Aslan ..................... G06N 20/00 |

(Continued)

FOREIGN PATENT DOCUMENTS

| CN | 107301459 | 10/2017 |
| CN | 107229972 | 9/2018 |
| EP | 1557788 | 7/2005 |

OTHER PUBLICATIONS

Abadi et al., "TensorFlow: A system for large-scale machine learning", 12th USENIX Symposium on Operating Systems Design and Implementation, Nov. 2016, 21 pages.

(Continued)

*Primary Examiner* — Mariela Reyes
*Assistant Examiner* — Courtney Harmon
(74) *Attorney, Agent, or Firm* — Fish & Richardson P.C.

(57) ABSTRACT

Methods, systems, and apparatus, including computer programs encoded on computer storage media, for training a machine learning model. A method includes: maintaining a plurality of training sessions; assigning, to each worker of one or more workers, a respective training session of the plurality of training sessions; repeatedly performing operations until meeting one or more termination criteria, the operations comprising: receiving an updated training session from a respective worker of the one or more workers, selecting a second training session, selecting, based on comparing the updated training session and the second training session using a fitness evaluation function, either the updated training session or the second training session as a parent training session, generating a child training session from the selected parent training session, and assigning the child training session to an available worker, and selecting a candidate model to be a trained model for the machine learning model.

30 Claims, 4 Drawing Sheets

(56) References Cited

U.S. PATENT DOCUMENTS

| | | | | |
|---|---|---|---|---|
| 2018/0240041 | A1* | 8/2018 | Koch | G06N 3/126 |
| 2019/0095819 | A1* | 3/2019 | Varadarajan | G06F 9/505 |
| 2019/0147430 | A1* | 5/2019 | Chen | G06N 20/20 705/40 |
| 2020/0012662 | A1* | 1/2020 | Walters | G06F 16/906 |
| 2020/0184337 | A1* | 6/2020 | Baker | G06F 18/285 |
| 2020/0387565 | A1* | 12/2020 | Caglar | G06N 20/00 |

OTHER PUBLICATIONS

Agarwal et al., "Oracle inequalities for computationally budgeted model selection," Proceedings of the 24th Annual Conference on Learning Theory, 2011, pp. 69-86.

Back et al., "An overview of parameter control methods by self-adaptation in evolutionary algorithms," Fundamenta Informaticae, 1998, 35(1-4):51-66.

Beattie et al., "Deepmind lab," arXiv preprint arXiv: 1612.03801, Dec. 2016, 11 pages.

Bellemare et al., "The arcade learning environment: An evaluation platform for general agents," J. Artif. Intell. Res.(JAIR), Jun. 2013, pp. 47:253-279.

Bengio, "Gradient-Based Optimization of Hyperparameters," Neural Computation, Sep. 1999, 18 pages.

Bergstra et al., "Algorithms for hyper-parameter optimization," Advances in Neural Information Processing Systems, Dec. 2011, pp. 2546-2554.

Bergstra et al., "Random search for hyper-parameter optimization," Journal of Machine Learning Research, Feb. 2012, 281-305.

Castillo et al., "G-prop-III: Global optimization of multilayer perceptrons using an evolutionary algorithm," Proceedings of the 1st Annual Conference on Genetic and Evolutionary Computation, Jul. 1999, 8 pages.

Castillo et al., "Lamarckian evolution and the Baldwin effect in evolutionary neural networks," arXiv preprint cs/0603004, Mar. 2006, 5 pages.

Clune et al., "Natural selection fails to optimize mutation rates for long-term adaptation on rugged fitness landscapes," PLOS Computational Biology, Sep. 2008, 4(9):e1000187: 8 pages.

Domhan et al., "Speeding up automatic hyperparameter optimization of deep neural networks by extrapolation of learning curves," IJCAI, Jun. 2015, pp. 3460-3468.

Fernando et al., "Convolution by Evolution: Differentiable Pattern Producting Networks," arxiv.org, Cornell University Library, Jun. 2016, 109-116.

Friedrichs et al., "Evolutionary tuning of multiple SVM parameters" Elxevier Science, Oct. 2004, 13 pages.

Gloger, "Self-adaptive evolutionary algorithms," Universität Paderborn, Jan. 2004, 17 pages.

Golovin et al., "Google vizier: A service for black-box optimization," Proceedings of the 23rd ACM SIGKDD International Conference on Knowledge Discovery and Data Mining, ACM, Aug. 2017, 1487-1496.

Gonzalez et al., "Batch Bayesian optimization via local penalization," Artificial Intelligence and Statistics, May 2016, pp. 648-657.

Goodfellow et al., "Generative adversarial nets," Advances in Neural Information Processing Systems, Dec. 2014, 9 pages.

Gulrajani et al., "Improved training of Wasserstein GANs," Advances in Neural Information Processing Systems, Mar. 2017, 11 pages.

György et al., "Efficient multi-start strategies for local search algorithms," Journal of Artificial Intelligence Research, Jul. 2011, pp. 407-444.

Hansen et al., "Completely Derandomized Self-Adaptation in Evolution Strategies" Evolutionary Computation, Jun. 2001, 9(2):39 pages.

Houck et al., "Empirical investigation of the benefits of partial lamarckianism," Evolutionary Computation, Mar. 1997, 5(1):31-60.

Hüsken et al., "Optimization for problem classes-neural networks that learn to learn," Combinations of Evolutionary Computation and Neural Networks, May 2000, 12 pages.

Hutter et al., "Sequential model-based optimization for general algorithm configuration," LION, 2011, pp. 5:507-523.

Igel et al., "Evolutionary optimization of neural systems: The use of strategy adaptation," Trends and Applications in Constructive Approximation, 2005, 23 pages.

Jaderberg et al., "Reinforcement learning with unsupervised auxiliary tasks," arXiv preprint arXiv:1611.05397, Nov. 2016, 14 pages.

Kingma et al., "Adam: A method for stochastic optimization," https://arxiv.org/abs/1412.6980v8, Jul. 2015, 15 pages.

Klein et al., "Fast Bayesian optimization of machine learning hyperparameters on large datasets," arXiv preprint arXiv:1605.07079, May 2016, 17 pages.

Ku et al., "Exploring the effects of Lamarckian and Baldwinian learning in evolving recurrent neural networks," Proceedings of 1997 IEEE International Conference on Evolutionary Computation, Apr. 1997, 5 pages.

Li et al., "Hyperband: A Novel Bandit-Based Approach to Hyperparameter Optimization," https://arxiv.org/abs/1603.06560v3, Nov. 2016, 48 pages.

Liu et al., "Hierarchical representations for efficient architecture search," https://arxiv.org/abs/1711.00436v1, Nov. 2017, 13 pages.

Loshchilov et al., "SGDR: Stochastic Gradient Descent with Warm Restarts," https://arxiv.org/abs/1608.03983, 2016, 16 pages.

Masse et al., "Speed learning on the fly," arXiv: 1511.02540, Nov. 2015, 25 pages.

Mnih et al., "Asynchronous methods for deep reinforcement learning," International Conference on Machine Learning, Jun. 2016, 10 pages.

Panayotov et al., "Librispeech: An ASR corpus based on public domain audio books," 2015 IEEE International Conference on Acoustics, Speech and Signal Processing (ICASSP), Apr. 2015, 5 pages.

PCT International Search Report and Written Opinion in International Appln. No. PCT/EP2018/082162, dated Mar. 1, 2019, 19 pages.

Radford et al., "Unsupervised representation learning with deep convolutional generative adversarial networks," https://arxiv.org/abs/1511.06434, last revised Jan. 2016, 16 pages.

Rasley et al., "Hyperdrive: Exploring hyperparameters with POP scheduling," Proceedings of the 18th International Middleware Conference, Dec. 2017, 13 pages.

Real et al., "Large-scale evolution of image classifiers," arXiv preprint arXiv:1703.01041, Jun. 2017, 18 pages.

Real et al., "Regularized Evolution for Image Classifier Architecture Search" arXiv, Oct. 2018, 16 pages.

Rosca et al., "Variational approaches for auto-encoding generative adversarial networks," arXiv preprint arXiv:1706.04987, Oct. 2017, 21 pages.

Sabharwal et al., "Selecting Near-Optimal Learners via Incremental Data Allocation," AAAI, Mar. 2016, 9 pages.

Salimans et al., "Improved techniques for training GANs," Advances in Neural Information Processing Systems, Dec. 2016, 9 pages.

Shah et al., "Parallel predictive entropy search for batch global optimization of expensive objective functions," Advances in Neural Information Processing Systems, Dec. 2015, 9 pages.

Smith, "Cyclical learning rates for training neural networks," https://arxiv.org/abs/1506.01186, Apr. 2017, 10 pages.

Snoek et al., "Practical Bayesian optimization of machine learning algorithms," Advances in neural information processing systems, 2012, 9 pages.

Snoek et al., "Scalable Bayesian optimization using deep neural networks," International Conference on Machine Learning, Jun. 2015, 10 pages.

Spears, "Adapting crossover in evolutionary algorithms," Proceedings of the Fourth Annual Conference on Evolutionary Programming, Mar. 1995, 18 pages.

Springenberg et al., "Bayesian optimization with robust Bayesian neural networks," Advances in Neural Information Processing Systems, Dec. 2016, pp. 9 pages.

Srinivas et al., "Gaussian process optimization in the bandit setting: No regret and experimental design," arXiv preprint arXiv:0912.3995, 2009, 17 pages.

(56) References Cited

OTHER PUBLICATIONS

Swersky et al., "Freeze-thaw Bayesian optimization," arXiv preprint arXiv:1406.3896, Jun. 2014, 12 pages.
Swersky et al., "Multi-task Bayesian optimization," Advances in neural information processing systems, Jan. 2013, 9 pages.
Van den Oord et al., "Wavenet: A Generative Model for Raw Audio" https://arxiv.org/abs/1609.03499, Sep. 2016, 15 pages.
Vaswani et al., "Attention is all you need," arXiv preprint arXiv:1706.03762, 2017, 11 pages.
Vezhnevets et al., "Feudal networks for hierarchical reinforcement learning," arXiv preprint arXiv:1703.01161, Mar. 2017, 12 pages.
Vinyals et al., "Starcraft II: A new challenge for reinforcement learning," arXiv preprint arXiv:1708.04782, Aug. 2017, 20 pages.
Welch, "The generalization of 'student's' problem when several different population variances are involved," Biometrika, Jan. 1947, 34(1/2):28-35.
Wu et al., "The parallel knowledge gradient method for batch Bayesian optimization," Advances in Neural Information Processing Systems, Dec. 2016, 9 pages.
Xue et al., "A survey on evolutionary computation approaches to feature selection," IEEE Transactions on Evolutionary Computation, Aug. 2016, 20(4):606-625.
Yang et al., "LR-GAN: Layered recursive generative adversarial networks for image generation," https://arxiv.org/abs/1703.01560, Aug. 2017, 21 pages.
Young et al., "Optimizing deep learning hyper-parameters through an evolutionary algorithm," Proceedings of the Workshop on Machine Learning in High-Performance Computing Environments, Nov. 2015, 5 pages.
Zhang et al., "Evolutionary computation meets machine learning: A survey," IEEE Computational Intelligence Magazine, Nov. 2011, 6(4):68-75.
Jaderberg et al., "Population Based Training of Neural Networks," CoRR, Nov. 2017, arxiv.org/abs/1711.09846, 21 pages.

* cited by examiner

POPULATION-BASED TRAINING OF MACHINE LEARNING MODELS

BACKGROUND

This specification relates to training machine learning models, including neural networks.

Machine learning models can be trained according to values of one or more hyperparameters to learn optimal values for one or more model parameters. Hyperparameters are parameters for training a machine learning model that are set before the model is trained. For example, the learning rate or a learning rate schedule for a model are examples of hyperparameters established before training. Model parameters are parameters that are updated during training, e.g., weights of a network layer in a neural network.

Conventionally, a hyperparameter search to identify optimal hyperparameter values for training a model is performed before training the model to learn optimal model parameter values.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a population-based training ("PBT") system implemented as computer programs on one or more computers in one or more locations that simultaneously trains a machine learning model having a plurality of model parameter values to perform a particular machine learning task, while at the same time searching for hyperparameter values to train the model.

In particular, the PBT system can update respective model parameter values of a plurality of candidate machine learning models ("candidate models") in parallel, by using a machine learning training method. The process of training each candidate model is broken into a plurality of respective training sessions during which the PBT system trains each candidate model using different hyperparameter values. Specifically, and for each training session, operations are executed by a computing device of a number of computing devices of the PBT system to train a candidate model according to respective hyperparameter values for the training session. At the end of a training session, the PBT system can then compare the results of two training sessions together and determine a better performing candidate model. The hyperparameter values of the winning "parent" training session can be mutated and used to reproduce a "child" training session. A candidate model can be trained according to the hyperparameter values specified in the child training session, by warm-starting the candidate model at an available computing device with model parameter values of the candidate model after completing the parent training session.

In this way, the PBT system can train a machine learning model from a plurality of candidate models to learn model parameter values, while also learning improved hyperparameter values by periodically comparing candidate models following training sessions and allowing the better performer candidate model to reproduce.

The subject matter described in this specification can be implemented to realize one or more of the following advantages. A PBT system can train a machine learning model while simultaneously learning improved hyperparameter values. The PBT system can warm-start a model with updated model and hyperparameter values at the same time, instead of training the model, searching for hyperparameter values separately, and then re-training the model according to the new hyperparameter values. The PBT system can also simultaneously train the candidate machine learning models while learning a learning-rate schedule for training, which can be used to efficiently re-train the machine learning model according to different training data later.

Each computing device of a distributed computing environment can perform any machine learning training method to train a candidate model, and a PBT controller of the system can coordinate training sessions representing different hyperparameter values. From the perspective of a computing device executing the candidate model according to parameter values of the training session, the computing device simply performs the machine learning training method according to any conventional technique but receives updated model and hyperparameter values from the PBT controller to warm-start a model for new training session.

The techniques described can be implemented with minimal configuration changes to existing distributed computing environments of computing devices configured to train a machine learning model. Each candidate model trained receives the benefit of a best performing candidate model identified by the PBT system, but a computing device training the candidate model does not need to receive information describing the configuration of other computing devices in a distributed computing environment training other candidate models, the status of training sessions executed by the other computing devices, or the architecture or configuration of the PBT system itself. For example, the PBT system can be flexibly implemented for any model architecture, loss function, or training procedure implemented by the distributed computing environment. In this black-box approach to population-based training, each computing device maintains independent model and hyperparameter values.

In addition, the PBT system can be flexibly implemented across a variety of different model training frameworks and/or in a variety of different programming languages. This is because the PBT system can be implemented using a plurality of computing devices and a controller that can be configured to communicate training data to each computing device independent of hardware or software implementation details for either the controller or the computing devices.

Parameter dependency issues can also be mitigated in a distributed computing environment training a machine learning model by techniques disclosed in this specification. This is because each computing device can receive and complete training sessions independent of one another, which avoids a bottleneck frequently observed in conventional approaches to training a model at a distributed-computing environment that includes training sessions that are dependent on results of previously-run training sessions. The independence of each computing device as it trains a respective candidate model can also make scaling training simpler, e.g., by easily adding more computing resources for executing training operations because there are no parameter dependency issues to resolve.

The details of one or more implementations of the subject matter of this specification are set forth in the accompanying drawings and the description below. Other features, aspects, and advantages of the subject matter will become apparent from the description, the drawings, and the claims.

DETAILED DESCRIPTION

Figure 1:
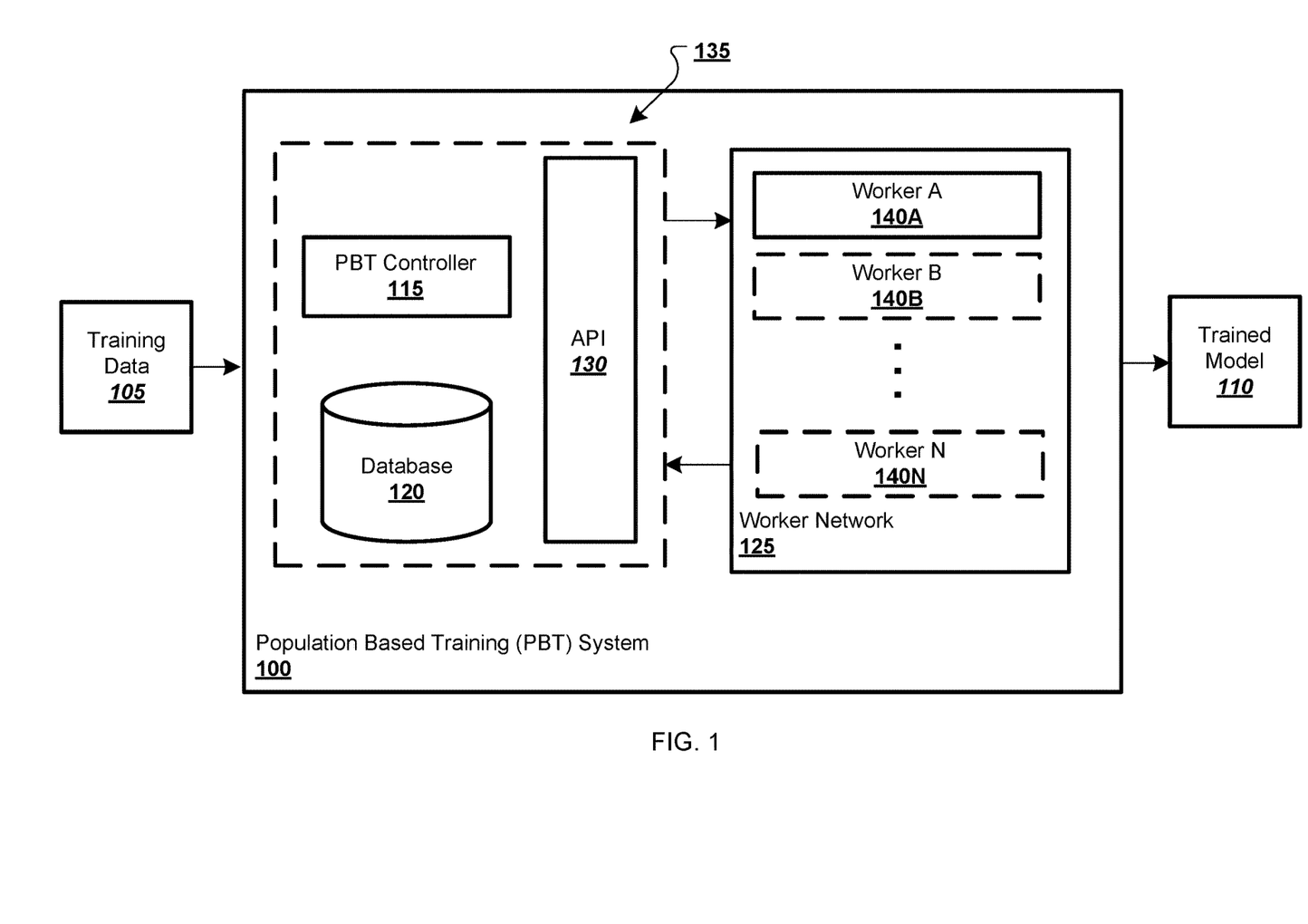
FIG. 1 illustrates an example population-based training ("PBT") system.

FIG. 1 shows an example population-based training ("PBT") system 100. The PBT system 100 is an example of a system implemented as computer programs on one or more computers in one or more locations, in which the systems, components, and techniques described below can be implemented.

The PBT training system 100 can receive training data 105 and generate a trained machine learning model 110 that can be implemented on one or more computers to perform a task. Examples of tasks include speech recognition, machine translation, and image recognition. The training data 105 can include one or more training examples each labeled with respective ground-truth output values. The training data 105 can be organized according to any appropriate data structure, e.g., a vector, a matrix, or generally a tensor of any degree.

The PBT system 100 can output data specifying the trained machine learning model 110, including the model's architecture, as well as trained model parameter values for the trained model 110. For example, the PBT system 100 can output data specifying a trained machine learning model that is a neural network, including trained weights for the neural network at each network layer.

In some implementations, the PBT system can also output the hyperparameter values used to train the machine learning model, and can also output a hyperparameter schedule representing the change of hyperparameter values during training for the trained model 110.

The PBT system 100 can provide data specifying the trained model 110 for later use in processing new inputs for the trained model 110. The PBT system 100 can instantiate a machine learning model having the model architecture and the trained model parameter values.

The PBT system 100 includes a PBT controller 115 and a database 120. The PBT system 100 also maintains a worker network 125 and implements an application programming interface ("API") 130. The PBT controller 115, the database 120, and the API 130 are collectively referred to in this specification as a PBT service 135.

The PBT controller 115 can be configured to initiate and maintain a plurality of training sessions executed by a respective worker of workers 140A-N in the worker network 125 and according to a set of hyperparameter values. In this specification, a worker refers to a computing device, e.g., a computing device that has one or more processing units, e.g., a central processing unit ("CPU"), a graphics processing unit ("GPU"), and/or a tensor processing unit ("TPU"), that is configured to train a candidate machine learning model according to the specified set of hyperparameter values. The worker network 125 refers to a collection of interconnected workers 140A-N. The workers 140A-N can be arranged according to any conventional network topology, e.g., a mesh or a torus, and can be implemented on the same or different physical devices.

The worker network 125 can be homogeneous or heterogeneous. The worker network 125 can include computing devices having all of one type of processing unit, or a mixture of different processing units. The workers can be physically connected, e.g., by wires, communicatively coupled, e.g., over a network, or a combination of both, in any conventional configuration.

The configuration of the worker network 125 is flexible given computational budgets from implementation-to-implementation. In some implementations, the size of the population of candidate models can be determined beforehand, e.g., based on the computational budget for training the machine learning model, or the number of available workers 140A-N in the worker network 125. In this specification, the candidate models trained by the workers 140A-N are collectively referred to as a "population" and the number of candidate models in the population is referred to as the "population size."

On one hand, given a fixed computational budget, the population size can be smaller, e.g., 5 candidate models, for faster training and flexibility in deploying new models or addressing any bugs in a specific implementation.

On the other hand, if there is no computational budget or if the budget is flexible, then training the machine learning model using a larger population, e.g., 20 candidate models, can cast the net wider in both searching for model parameter values for the best candidate model and searching for optimal or near-optimal hyperparameter values. If it is likely that the machine learning model will be later re-trained on different training data, starting with an initially larger population size can be advantageous to obtain an optimal or near-optimal hyperparameter values that can be re-used in later training.

Hyperparameter values for a candidate model are values that are not modified during a training session. Rather, the PBT system 100 can modify hyperparameter values for a candidate model following the end of a training session completed by a worker, as described below. The hyperparameters can include parameters that impact how the values of the model parameters are updated by training, e.g., a learning rate or weights assigned to various terms of the loss function. In some implementations, the hyperparameters also include parameters related to the architecture of the machine learning model. For example, the hyperparameters can include parameters for the number of hidden layers of a neural network, or the type of activation function used by each node of a network layer. In some implementations in which some candidate models have different architectures than other models in the population, the hyperparameter values can specify necessary information defining a specific architecture for the candidate models having the different architectures.

As described briefly above, a worker can be configured to train a candidate model according to hyperparameter values defined in a training session assigned to the worker. Specifically, a worker can be configured to start training a candidate model by repeatedly performing operations to compute a loss function given current model parameter values for a candidate model and hyperparameters of a current training session. Then, the worker can update the model parameter values according to some training algorithm, e.g., gradient descent.

The worker can additionally be configured to train a candidate model by warm-starting. Warm-starting refers to setting model parameter values of a candidate model according to a previously defined set of model parameter values that were obtained as a result of some earlier training. Then, the worker can start a training session according to the hyperparameter values of the training session, but with the benefit of partially trained model parameter values. Warm-starting can be used to save and restore models as "checkpoints," described below. A worker can implement checkpoints according to any appropriate technique, e.g., as a TensorFlow checkpoint object.

A worker can end a training session upon reaching some stopping condition. The stopping condition can be to perform a certain number of iterations during the training session, or compute a loss function whose output is within a predetermined threshold of a target value, e.g., within a threshold of a theoretical optimum for the loss function. The PBT controller 115 can maintain which workers of the worker network 125 are currently in a training session.

At the start of training, the PBT controller 115 can assign each worker an initial training session. The respective initial model parameter values and hyperparameter values of each training session can be initialized using any appropriate technique. For example, the PBT controller 115 can initialize the values of each initial training session randomly. In some implementations, the values of each initial training session are initialized sequentially by incrementing or decrementing an initial value. The PBT controller 115 can be configured to assign initial training sessions to the worker network 115 and perform other functions by implementing the API 130.

The API 130 can define a plurality of functions, that when executed by the PBT controller 115, cause the PBT controller 115 to execute operations to manipulate the worker network 125. For example, the API 130 can include functions for starting a new training session performed by a worker in the worker network 125, ending a training session, obtaining fitness information for a training session, and for sending checkpoints or new training sessions to an available worker.

In some implementations, each worker of the worker network 120 is configured to execute one or more functions of the API 115 for transmitting and requesting data. For example, a worker can send an indication to the PBT controller 115 that it has completed a current training session for its respective machine learning model. After completing a training session, the worker can also request a new training session from the PBT controller 115.

Because the PBT controller 115 can initialize each training session with respective different hyperparameter and initial model parameter values, some workers can finish a training session, i.e., reach a stopping condition, before others. Workers can also finish training sessions at different times if the worker network 125 is heterogeneous, because the specific configurations and computing resources available to each worker can affect individual training times.

A worker can send an indication to the PBT controller 115 when the worker has completed a training session. The indication can include a final checkpoint for the candidate model for the training session just completed by the worker. A final checkpoint refers to the model parameter values for the candidate model after the respective worker for the model reached a stopping condition during the training session.

After some period of time, the PBT controller 115 can receive an indication of a completed training session and a final checkpoint for the training session, from a worker. The final checkpoint represents updated model parameter values for the model parameter of the values assigned to the worker previously.

Next, the PBT controller 115 can select an initiator training session for initiating a competition between training sessions that will ultimately lead to the creation of a new training session. To do so, the PBT controller 115 can be configured to select the recently completed training session as an initiator. In some implementations, the PBT controller 115 is configured to sample a maintained list of completed training sessions randomly to obtain an initiator training session.

The PBT controller 115 can then select an opponent training session for the initiator training session. The PBT controller 115 can select an opponent, for example, by sampling from maintained lists of pending and completed training sessions. In general, the PBT controller 115 compares the initiator and opponent training sessions and generates a new training session as a result of the comparison.

In this specification, a training session is said to belong to a generation of the population. Whenever a new training session is created following a competition between an initiator and an opponent, the newly created training session is said to belong to a generation that immediately succeeds the generation of the initiator. Also, in this specification, an ancestor training session is a training session that was part of a competition that directly or indirectly resulted in the creation of a descendent training session. Necessarily, an ancestor training session will belong to a generation that precedes a descendent training session.

In some implementations, the PBT controller 115 samples only from training sessions that have not previously been selected for competition, i.e., as an initiator or as an opponent. The reason for doing so is at least to promote diversity between generations, which can improve the accuracy of the final trained model by avoiding a scenario in which training sessions are overrepresented or underrepresented during training due to an unrestricted opponent selection process.

In this specification, a training session that can still be selected as an initiator is referred to as an "available" training session. A training session can only be sampled once as an initiator, but can be sampled as an opponent to an initiator multiple times. In some implementations, the PBT controller 115 can sample an opponent from any generation—preceding, succeeding, or current—relative to the initiator. Recall that in some implementations where the worker network is heterogeneous, individual times taken by worker to complete respective assigned training sessions can vary, therefore, it is possible and sometimes likely that pool of available training sessions will include training sessions descended from more ancestors than others.

Alternatively, or in addition, the PBT controller 115 can be configured to only sample an opponent from training sessions within a certain number of generations from the generation of the initiator, e.g., no more than 2 generations away. One way to reduce potential inaccuracies is to limit opponents for an initiator within a range of generations close to the initiator's generation. Generally, the further apart two training sessions are by generation, the greater the disparity in respective measures of fitness.

The PBT controller 115 can also sample an initiator from available training sessions from present or past generations within a predetermined range, as another way to improve overall accuracy. One reason for the better performance is because this approach relieves the effect of speed differences in different workers and mitigates training sessions reproduced at a time much later than when they were created.

The PBT controller 115 can sample an opponent for the initiator using any technique described above for sampling an initiator training session, with the relaxed requirement that the sampled opponent training session can be sampled multiple times during opponent selection for different initiators.

The PBT controller 115 can evaluate the fitness of both the opponent and the initiator training sessions to compare the training sessions and select a better performing training session. The fitness of a training session is a representation of how well the respective candidate model trained by a respective worker is performing, e.g., how close the actual output candidate model is given its current model parameters versus an expected output.

The fitness of a training session can be represented as a tuple: $f(t)=[f_1(t), f_2(t), \ldots, f_k(t)]$, where t is the training session and $f_i$ is the i-th fitness evaluation function. Representing the fitness of a training session as a generalized tuple reflects that the machine learning model can be trained for tasks containing multiple objectives. It is often the case that some objectives are missing due to noisy or missing data. Therefore, representing all objectives in the generalized fitness function allows for a thorough and robust comparison between training sessions.

A comparison between two training sessions is referred to in this specification as a "competition," e.g., a competition between an initiator and an opponent. Each worker, upon completing a training session, can be configured to execute the fitness evaluation function on the completed training session to obtain a measure of fitness for the complete training session. In some implementations, the PBT controller 115 receives the measure of the fitness for a completed training session from a worker, in addition to the final checkpoint and a request for a new training session.

In some implementations, each fitness evaluation function can be assigned a priority weight, indicating that a win or loss for a training session as compared with the other training session using a particular weighted fitness evaluation function should be given more or less weight. Alternatively, the fitness of each training session can be compared by order of priority, e.g., the PBT controller 115 compares $f_1(a)$ and $f_1(b)$ and selects a winner from only this comparison. If $f_1(a)$ and $f_1(b)$ are equivalent, then the PBT controller 115 can repeat the process for $f_2(a)$ and $f_2(b)$ and so on. However the fitness of each training session is compared, the "better performer" or "winner" is the training session with the higher measure of fitness.

For example, the worker for training session a evaluates f(a) and the worker for training session b evaluates f(b). Then, the PBT controller 115 can compare f(a) and f(b) to identify the better performing training session. If f corresponds to multiple fitness evaluation functions, the PBT controller 115 can compare each $f_i(a)$ with each $f_i(b)$ and tally a "win" for the training session having the better score. Depending on the configuration of the PBT controller 115, a better score can mean either a lower or higher score for the winning training session as compared with the losing training session. The winner of the competition between training sessions a and b can be the training session with the most individual wins. In the event of a tie, the PBT controller 115 can select a winner from the training sessions a and b, e.g., randomly.

The PBT controller 115 can update a respective status for the initiator training session as unavailable to initiate another competition. For example, the PBT controller 115 can maintain a separate flag for each pending and completed training session indicating the availability of the training session for initiating a competition. In some implementations in which only available training sessions are allowed to compete, the PBT controller 115 can maintain separate lists of available and unavailable training sessions.

Enforcing a requirement that each training session only initiate competition once can be advantageous to promote final trained parameter values representative of shared knowledge from across the whole population, that are not dominated by a subset of training sessions that performed marginally better early on and can disproportionately influence the resultant trained model. In addition, broader competition can generate trained models with a higher confidence of accuracy, at least because the PBT system 100 is more likely to reproduce the same trained model 110 given the same training data 105 and initial hyperparameter and model parameter values.

Next, the PBT controller 115 can spawn a child training session from the selected parent training session by a process referred to in this specification as reproduction. The hyperparameter values of the parent training session can be mutated, i.e., randomly perturbed, according to some predetermined multiplier, e.g., 0.8 or 1.2. In some implementations, the hyperparameters include categorical or discrete parameters. For a categorical parameter, the PBT controller 115 can mutate the parameter value by randomly sampling from a set of possible categorical parameter values. For a discrete parameter, the PBT controller 115 can mutate the parameter value by restricting the parameter value to mutate to either the lowest larger element that is larger than a predetermined threshold or the largest lower element that is smaller than a predetermined threshold.

Lastly, the PBT controller 115 can send or queue the new child training session to be processed by a worker, as a new training session. The training session can include the final checkpoint of the candidate model as trained by a respective worker according to the hyperparameter values of the parent training session. The final checkpoint is referred to as the "parent checkpoint" and can be included as part of the child training session to warm-start the child training session.

The PBT controller 115 can track and update one or more training session fields for each training session. For example, the training session fields can include the hyperparameter values for the training session. In some implementations, the training session fields include metadata that does not relate to the hyperparameter values of the training session, such as a training session ID uniquely identifying each training session. In addition to the hyperparameter values and a training session ID, the training session fields for a training session can include one or more of the following:

1. A warm start checkpoint path field, specifying model parameter values that a worker receiving the training session can use to warm-start a new training session;
2. A parent training session ID field, indicating the training session ID for the training session's parent; and
3. If the training session includes a warm-start checkpoint path field, then, optionally, the training session can also include a fitness evaluation value representing a measure of fitness for the model parameters of the warm-start checkpoint.
4. An initiator training session ID, indicating the training session ID of a training session that initiated the reproduction that resulted in the current training session. The initiator training sessions ID can be maintained to be used as a check to prevent the PBT controller 115 from selecting the initiator training session to initiate a competition again.

The PBT controller 115 continues to receive completed training sessions and to send new training sessions until detecting one or more termination criteria have been met. For example, termination criteria can include a number of iterations of reproducing new training sessions, a certain threshold performance for the candidate models, or detecting that there are no more available training sessions to select as an opponent. If the PBT controller 115 runs out of available training sessions before the termination criteria have been met, then the PBT controller 115 can be configured to randomly sample additional training sessions to continue training, including randomly sampling hyperparameter and model parameter values for each additional training session.

Then, the PBT controller 115 can select a best performing candidate model to be the trained model 110, e.g., by comparing each candidate model according to a fitness evaluation function, e.g., the fitness evaluation function described above. In some implementations, the PBT controller 115 can provide more than one candidate model to a user, e.g., where the user interacts with the PBT system 100 through a user interface. In those implementations, the user can select from the provided candidate models which candidate model to be the trained model 110.

By warm-starting the candidate model trained by the worker receiving the child training session, the PBT system can simultaneously train the candidate models while also searching for optimal or near-optimal hyperparameter values. The PBT system can save time and computational resources, at least by joining training with hyperparameter searching, conventionally performed as separate procedures. Warm-starting a model can allow for the transfer of existing knowledge gained in previously trained models and can enable efficient hyperparameter search.

As described below with reference to FIG. 3, the PBT system can also generate a hyperparameter schedule for training, by tracking the lineage of training sessions for the trained model 110 that the PBT controller 115 selects from the final candidate models. A hyperparameter schedule is a schedule of changes of hyperparameter values over the course of time or a number of iterations in which a model is trained. For example, a learning-rate schedule is an example of a hyperparameter schedule that tracks the values of a learning-rate of a neural network over time. Changing the learning-rate of a neural network during the course of training can yield more accurate results versus maintaining a fixed learning-rate for the duration of training. The PBT system 100 can generate a hyperparameter schedule for training with minimal additional processing, and a generated schedule can be easily re-used for training similar machine learning models on different sets of training data.

Figure 2:
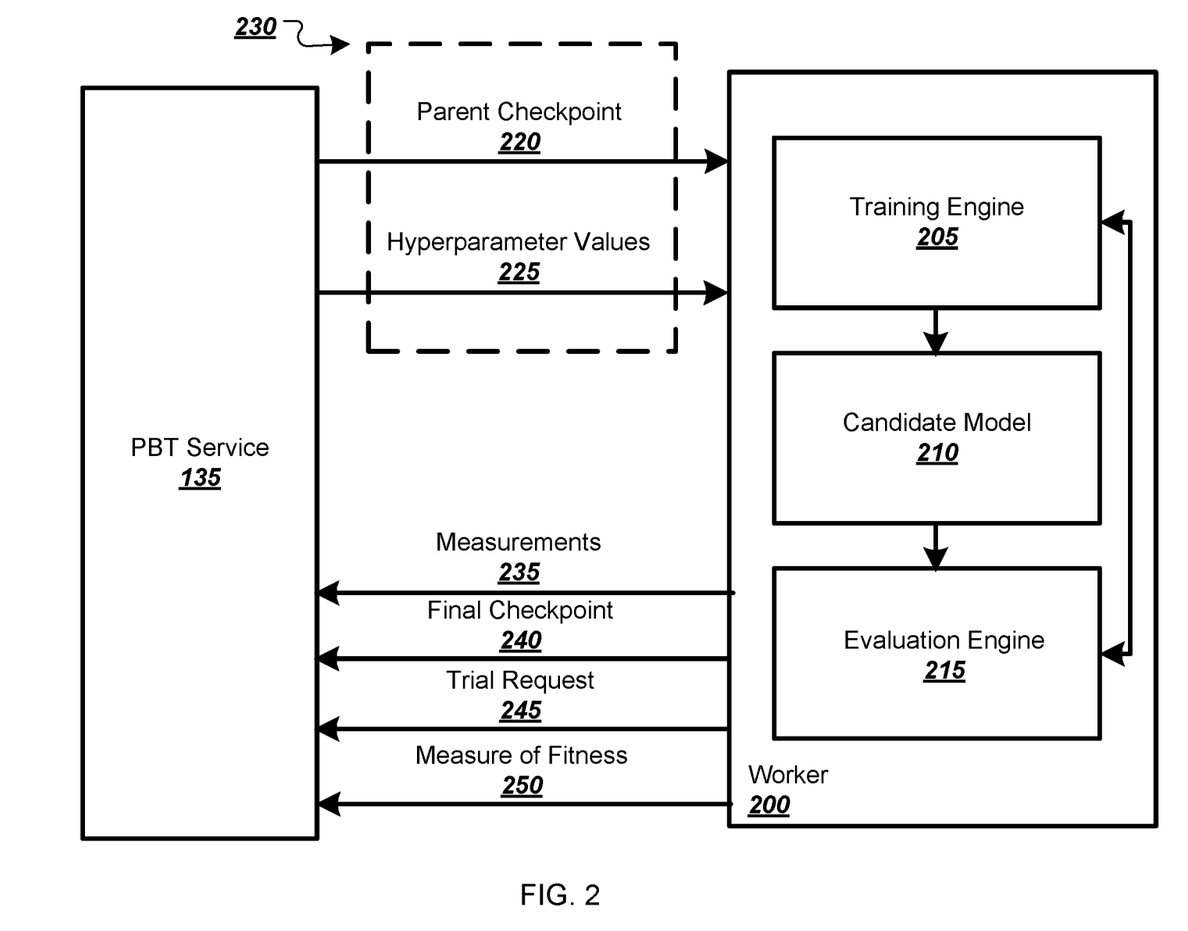
FIG. 2 illustrates a worker interacting with the PBT service.

FIG. 2 illustrates a worker 200 interacting with the PBT service 135. The worker includes a training engine 205, a candidate model 210, and an evaluation engine 215. The training engine 205 can be configured to execute the training operations to train the candidate model 210 during a training session. The training engine 205 can receive a parent checkpoint 220 and hyperparameter values 225 from the PBT service 135. Collectively, the parent checkpoint 220 and the hyperparameter values 225 are referred to this in specification as a "training session suggestion" 230.

The worker can receive a training session at generation 0 with hyperparameter values 225 that can be initialized by the PBT controller 115, as described above with reference to FIG. 1. The parent checkpoint 220 can include model values initialized by the PBT controller 115, or alternatively generated by some other technique for initializing training.

The training engine 205 can construct the candidate model 210 from the parent checkpoint 220 and the hyperparameter values 225. For example, the training engine 205 can obtain values from the hyperparameter values 225 corresponding to the architecture of the model, e.g., how many hidden layers the candidate model has, in implementations in which the machine learning model being trained is a neural network. The hyperparameter values 225 can also include weights for terms in the fitness evaluation function used in training the candidate model 210. The training engine 205 can populate the values of the constructed candidate model 210 using the model parameter values of the parent checkpoint 220.

After constructing the candidate model 210, the training engine 205 can execute the training session by repeatedly performing training operations starting from the model parameter values of the parent checkpoint 220 until reaching a stopping condition. The training engine 205 can be configured to warm-start a new training session by any appropriate warm-starting or checkpoint technique. For example, the training engine 205 can warm-start training for the candidate model 210 using methods available in the TensorFlow library, e.g., tf.train. Saver.restore.

In some implementations in which the hyperparameter values 225 include parameter values related to the architecture of the candidate model 210, the training engine 205 is configured to warm-start training by comparing architecture-specific parameters in a checkpoint with the candidate model architecture and restoring only values matching the candidate model architecture. This technique of model variable matching can be useful when the architecture of each candidate model in a population differs. The PBT controller 115 does not need to know specifics about each model architecture, and can instead provide hyperparameter values that can satisfy every candidate model trained by the worker network 125. Then, the training engine 205 can select only parameter values corresponding to the architecture of the candidate model 210 and ignore parameter values that do not correspond to the model.

From the worker's perspective, the worker is merely performing training operations with updated parameter values received from the PBT service 135. Therefore, the PBT service 135 does not need to know specific implementation details of: (i) how the training engine 205 trains the candidate model, or (ii) how the training engine constructs the candidate model 210 from the parent checkpoint 220 and the hyperparameter values 225. The PBT service merely has to be configured to provide the hyperparameter values 225 and the parent checkpoint 220, which is easier to implement over conventional approaches while still remaining flexible for interacting with different types of worker networks.

In general, the evaluation engine 215 can be configured to evaluate the candidate model 210 during a training session, and report back measurements 235 to the PBT service 135. The measurements 235 can include a fitness value for the current training session. The measurements 235 can also include successive model parameter values after a predetermined number of iterations of training during the training session. The PBT service 135 can be configured to receive at least a portion of the measurements 235. The training engine 205 and the evaluation engine 215 can be synchronized so that the evaluation engine 215 can generate new measurements during the current training session.

The measurements can include objective values of the current model generated by evaluating the candidate model on a validation dataset that is separate from data used to train the candidate model. The measurements can also include the checkpoint path of the candidate model that tracks the candidate model's progression over a plurality of checkpoints.

The evaluation engine 215 can be configured to provide measurements to the PBT service 135 automatically, either after each iteration of training or after a predetermined number of iterations. For example, the evaluation engine 215 can provide measurements for each candidate model after 1000 iterations of training. Also after the predetermined number of iterations has passed, the PBT service 135 can be configured to execute opponent selection and reproduction, as described above.

In addition, the training engine 205 can communicate with the evaluation engine 215 to indicate that a stopping condition has been met. In response, the evaluation engine 215 can transmit a final checkpoint 240 to the PBT service 135. The final checkpoint 240 can represent the model parameter values of the candidate model 210 after reaching the stopping condition, as well the as the hyperparameter values used to train the model 210, i.e., the hyperparameter values 225. Upon sending the final checkpoint 240, the worker 200 can additionally send a new training session request 245.

As described above, the evaluation engine 215 can generate a measure of fitness by executing a fitness evaluation function on model parameter values represented by the final checkpoint 240. In addition to sending the PBT service 135 the final checkpoint 240 and a training session request 245, the worker can also send the measure of fitness 250 that the PBT service 135 can use to compare the completed training session with another training session during a competition.

The PBT controller 135 can be configured to perform garbage collection on received checkpoints from the workers of the worker network 125. For example, the PBT service 135 can be configured to periodically remove checkpoints stored in the database 120 that have already been evaluated. In some implementations and referring to FIG. 2, the PBT service 135 is configured to immediately discard all or some of the measurements 235. In some implementations the PBT service 135 is configured to store only the final checkpoint 240 received from the worker 200 after completing a training session.

When available computing resources for a worker network are limited, the PBT controller 115 can be configured to simulate unrestrained population-based training with a large population size, but using only a small number of workers, e.g., as few as one worker. pecifically, the PBT controller 115 can be configured to always pick the oldest training session that has not yet initiated any reproduction and only start reproduction when the initiator's generation has reached a predetermined population size.

Often, there is a need to re-train a machine learning model after it has been trained, on a different set of training data. Because populations of candidate models can be very large, e.g., 20 models trained at once, a naive approach of simply processing the new training data through the PBT system to obtain a new trained model can be computationally expensive and time-consuming. Instead, the PBT service 135 can be additionally configured to facilitate re-training using "subset training replay" and a "training session dependency graph," either alone or in combination.

To implement these features, the PBT service 135 can be configured to represent each training session as a directed acyclic graph ("DAG") of training session dependencies, i.e., a training session dependency graph. These features are described below with reference to FIG. 3.

Figure 3:
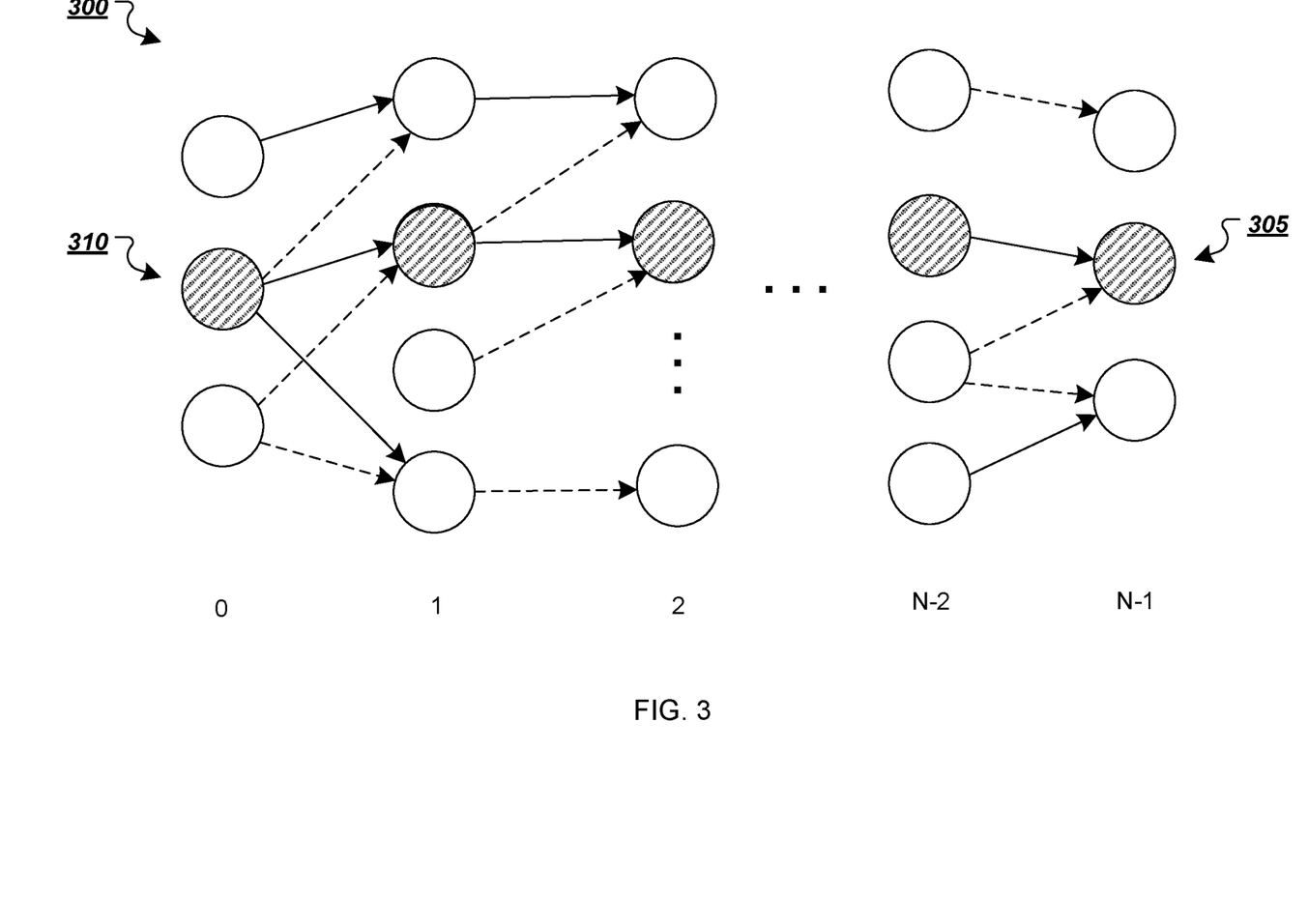
FIG. 3 illustrates an example training session dependency graph for a worker network.

FIG. 3 illustrates an example training session dependency graph 300 for a worker network. The graph 300 represents N-1 generations of training sessions trained by the workers of the worker network, beginning at generation 0, i.e., the initial generation, and ending at generation N-1. Each node in the training session dependency graph 300 represents a training session processed by a respective worker of the worker network 125. Recall that each training session can be identified by a respective training session ID, and the PBT service 135 through the database 120 can maintain information for each training session, for example indexed by ID. Except for the initial training sessions at generation 0, each training session will have one parent training session.

The training session dependency graph 300 is a DAG because a training session at a later generation can never be a parent for a training session in an earlier or current generation.

In some implementations, the training session dependency graph can also represent relationships between a current training session and a previous training session that lost in a competition with the parent of the current training session. If the losing training session is an opponent, i.e., not an initiator, for the competition, then the PBT controller can sample the losing training session again in a future competition or select the losing training session as an initiator for another competition.

In the graph 300, these types of relationships are indicated by dashed edges. The PBT service 135 can enforce parent-child relationships between previous and current generations using the training session dependency graph 300, e.g., by adding a training session as dependent to another training session and performing a topological sort to determine whether the new graph is still a DAG.

In some implementations in which the PBT service 135 implements subset training replay, the PBT service 135 can select a subset of training sessions having different ancestor training sessions for training the machine learning model on a different set of training data. The PBT service 135 can receive a selection of training sessions from a user, or the PBT service 135 can select the subset of training sessions according to some predetermined condition. For example, the PBT service 135 can select the subset based on a minimum fitness threshold, or based on the differences in ancestry between training sessions, i.e., selecting training sessions for the subset produced from different lines of ancestor training sessions.

Subset training replay can be used, for example, to seed different machine learning models in an ensemble machine learning method. A machine learning ensemble includes multiple machine learning models which are trained together to obtain better predictive performance based on the collective, rather than individual performance of any one model in the ensemble.

By maintaining a training session dependency graph, the PBT service 135 can also efficiently keep track of an optimal or near-optimal hyperparameter schedule for training. For example, the PBT service 135 can extract a lineage of training sessions used to train the trained model 110. A lineage for a training session is a sub-graph of the training session dependency graph that traces parent-child relationships for a training session at a current generation, up to an ancestor training session. For example, in FIG. 3, training session 305 and training session 310 share a same lineage, as indicated by the inter-connected cross-hatched nodes representing training sessions in the lineage.

The PBT service 135 can also generate a lineage of training sessions for reproducing a training session. Specifically, the hyperparameter values for each training session can be re-used in a new sequence of training as a hyperparameter schedule, using the same training sessions, but on the new set of training data.

The PBT service 135 is a stateless service. Therefore, in the event that a worker fails and is unable to perform a training session, the PBT service 135 can pause until the worker is fixed or is removed from the worker network 120, before beginning again. The previously-failed worker, if it has not been removed, can continue to receive training sessions from the PBT controller 115 as normal. Further, workers in the worker network 125 can operate independent from each other, which can simplify implementations when each worker operates in parallel with other workers.

Figure 4:
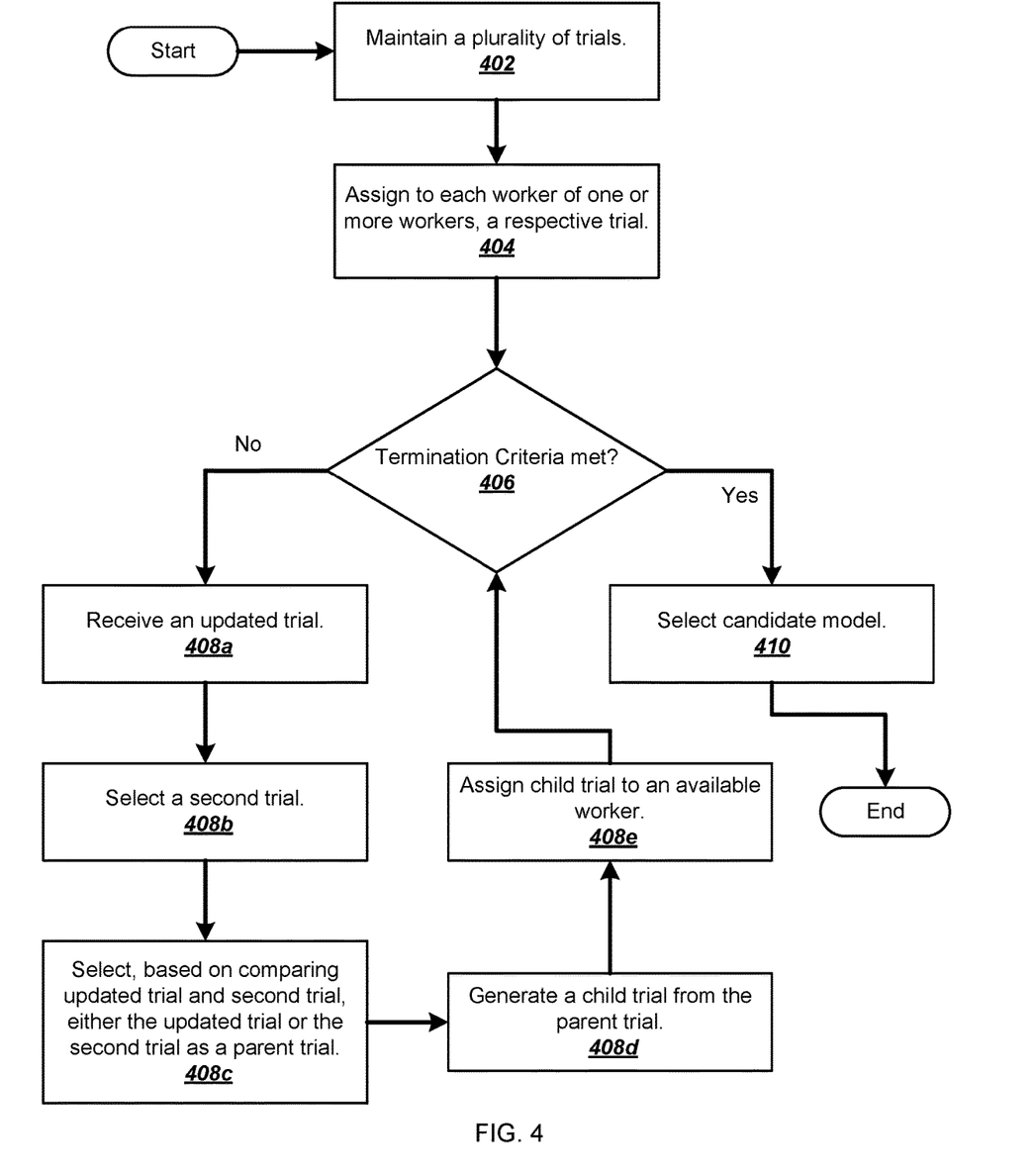
FIG. 4 is a flow chart of an example process for training a machine learning model.

FIG. 4 is a flow chart of an example process for training a machine learning model. For convenience, the example process will be described as being performed by a system of one or more computers, located in one or more locations, and programmed appropriately in accordance with this specification. For example, a PBT system, e.g., the PBT system 100 of FIG. 1, appropriately programmed, can perform the example process of FIG. 4.

The PBT system maintains a plurality of training sessions, wherein a training session comprises data defining hyperparameter values and model parameter values (step 402). As described above with respect to FIG. 1, the PBT system can maintain a plurality of training sessions as lists of current and pending training sessions. Additionally, the PBT system can receive measurements from workers relating to each training session, and keep track of the training session's availability for opponent-selection.

The PBT system assigns, to each worker of one or more workers, a respective training session of the plurality of training sessions (step 404). The PBT system can assign a training session to each worker of the worker network, as described above with reference to FIG. 1. Each worker can be configured to receive a training session, initialize a respective candidate model with model parameter values of the training session, train the respective candidate model starting from the model parameter values of the training session and according to hyperparameter values of the training session to determine final model parameter values for the training session, and update the training session to replace the model parameter values in the training session with the final model parameter values for the training session;

The PBT system repeatedly performs operations described at steps 408*a-e* of FIG. 4, until meeting one or more termination criteria (decision diamond 406). The termination criteria can include a predetermined number of iterations of the operations, or a period of time. The termination criteria can also include a minimum measure of fitness, e.g., per-candidate model or an average across all candidate models.

The PBT system receives an updated training session from a respective worker of the one or more workers, wherein the updated training session identifies a first training session assigned to the respective worker and final model parameter values determined by the respective worker for a first training session assigned to the respective worker (step 408*a*). The updated training session can be represented by the final checkpoint for the training session after the respective worker assigned to the training session reaches a stopping condition during training.

The PBT system selects a second training session from the plurality of training sessions (step 408*b*). The second training session is the opponent of the initiator, and can be selected in any appropriate manner as described above, with reference to FIG. 1.

The PBT system selects, based on comparing the updated training session and the second training session using a fitness evaluation function, either the updated training session or the second training session as a parent training session (step 408*c*). The PBT system can execute the fitness evaluation function for both the updated training session and the second training session to obtain a respective measure of fitness for each training session. Alternatively, and as described above with reference to FIG. 2, the PBT system can receive a pre-evaluated measure of fitness from a worker requesting a new training session, and compare the measure of fitness of the updated training session with the measure of fitness for the second training session.

The PBT system generates a child training session from the selected parent training session, wherein the child training session includes new hyperparameter values and child model parameter values, and wherein the child model parameter values are the model parameter values in the parent training session (step 408*d*). As described above with reference to FIG. 1, the PBT system can generate the hyperparameter values for the child training session by randomly perturbing the hyperparameter values of the parent training session, e.g., by a random modifier.

The PBT system assigns the child training session to an available worker (step 408*e*).

After meeting the one or more termination criteria, the PBT system selects a candidate model trained by a worker of the one or more workers to be a trained model for the machine learning model (step 410).

This specification uses the term "near-optimal" in connection with model parameter values and hyperparameter values. A near-optimal value is a value for a parameter once termination criteria for training has been satisfied. A near-optimal value for a parameter generally results in improved performance of a machine learning model for a task, relative to other values for the parameter previously obtained during the training process. In many real-life cases, it may be impractical or impossible to train or search for values until reaching a true optimum value.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback;

and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Implementations of the subject matter described in this specification can be implemented in a computing system that includes a backend component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments of the attached claims and the embodiments described above, the following numbered embodiments are also innovative:

Implementation 1 is a method of training a machine learning model, the method comprising: maintaining a plurality of training sessions, wherein a training session comprises data defining hyperparameter values and model parameter values; assigning, to each worker of one or more workers, a respective training session of the plurality of training sessions, wherein each worker is configured to receive a training session, initialize a respective candidate model with model parameter values of the training session, train the respective candidate model starting from the model parameter values of the training session and according to hyperparameter values of the training session to determine final model parameter values for the training session, and update the training session to replace the model parameter values in the training session with the final model parameter values for the training session; repeatedly performing operations until meeting one or more termination criteria, the operations comprising: receiving an updated training session from a respective worker of the one or more workers, wherein the updated training session identifies a first training session assigned to the respective worker and final model parameter values determined by the respective worker for a first training session assigned to the respective worker, selecting a second training session from the plurality of training sessions, selecting, based on comparing the updated training session and the second training session using a fitness evaluation function, either the updated training session or the second training session as a parent training session, generating a child training session from the selected parent training session, wherein the child training session comprises new hyperparameter values and child model parameter values, wherein the child model parameter values are the model parameter values in the parent training session, and assigning the child training session to an available worker; and selecting a candidate model trained by a worker of the one or more workers to be a trained model for the machine learning model.

Implementation 2 is the method of implementation 1, wherein the operations further comprise: determining that the one or more termination criteria have been met; and in response to determining that the one or more termination criteria have been met, selecting the candidate model trained by the worker of the one or more workers to be the trained model for the machine learning model.

Implementation 3 is the method of any one of implementations 1 through 2, wherein the one or more termination criteria comprise each training session in the plurality of training sessions having been compared to a respective other training session in the plurality of training sessions.

Implementation 4 is the method of any one of implementations 1 through 3, further comprising: receiving a request for final hyperparameter values used to train the selected candidate model, and in response to the request, providing hyperparameter values of a training session used by the worker that trained the selected candidate model.

Implementation 5 is the method of any one of implementations 1 through 4, wherein the operations further comprise: maintaining a training session dependency graph, wherein each node of the training session dependency graph corresponds to a respective training session of the plurality of training sessions, and each edge between a pair of nodes in the training session dependency graph corresponds to a training session represented by a first node of the pair of nodes having been generated from another training session represented by a second node of the pair of nodes.

Implementation 6 is the method of any one of implementations 1 through 5, wherein the plurality of training sessions comprises one or more initial training sessions, wherein the one or more initial training sessions comprise respective hyperparameter values sampled from a first distribution of values, and respective model parameter values sampled from a second distribution of values, and wherein the operations further comprise: generating a hyperparameter schedule for the selected candidate model, comprising: identifying a particular training session assigned to a worker of the one or more workers, wherein the particular training session comprises model parameter values corresponding to model parameter values of the selected candidate model, generating a subgraph comprising a node representing the particular training session and respective nodes whose respective edges form a path from the node comprising the node representing the particular training session and a node representing an initial training session of the one or more initial training sessions, and obtaining a hyperparameter schedule from respective hyperparameter values of each training session represented by a respective node in the subgraph.

Implementation 7 is the method of any one of implementations 1 through 6, wherein generating the child training session from the selected parent training session comprises generating modified hyperparameter values for the new training session by multiplying respective hyperparameter values of the parent training session with a randomly sampled value.

Implementation 8 is the method of any one of implementations 1 through 7, wherein the one or more workers comprise respective one or more processing units.

Implementation 9 is the method of any one of implementations 1 through 8, wherein the one or more processing units are heterogeneous.

Implementation 10 is the method of any one of implementations 1 through 9, wherein respective final parameter values for each training session request of the plurality of training session requests is represented as a checkpoint software object.

Implementation 11 is the method of any one of implementations 1 through 10, further comprising: providing the trained model for use in processing new inputs.

Implementation 12 is a system comprising: one or more computers and one or more storage devices storing instructions that are operable, when executed by the one or more computers, to cause the one or more computers to perform the method of any one of claims 1 to 11.

Implementation 13 is a computer storage medium encoded with a computer program, the program comprising instructions that are operable, when executed by data processing apparatus, to cause the data processing apparatus to perform the method of any one of claims 1 to 11.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results.

As one example, the processes depicted in the accompanying figures do not necessarily require the particular order shown, or sequential order, to achieve desirable results. In some cases, multitasking and parallel processing may be advantageous.

What is claimed is:

1. A method of training a machine learning model, the method comprising:
   maintaining a plurality of training sessions for training a machine learning model, wherein a training session of the plurality of training sessions comprises data defining (i) respective hyperparameter values for training the machine learning model and (ii) model parameter values of the machine learning model, and defines a session during which the machine learning model is trained by repeatedly updating the model parameter values of the machine learning model according to the respective hyperparameter values;
   assigning, to each worker of one or more workers, one or more respective training sessions of the plurality of training sessions, each worker comprising one or more processing units to train the machine learning model during the assigned one or more respective training sessions,
   wherein for each worker of the one or more workers and each of the one or more respective training sessions assigned to the worker, the worker is configured to receive the training session, initialize a respective candidate model with model parameter values defined by the training session, train the respective candidate model starting from the model parameter values of the training session and according to hyperparameter values defined by the training session to determine final model parameter values for the training session, and update the training session by replacing the model parameter values defined by the training session with the final model parameter values determined for the training session;
   repeatedly performing operations until meeting one or more termination criteria, the operations comprising:
      receiving an updated training session from a respective worker of the one or more workers, wherein the updated training session identifies a first training session assigned to the respective worker and the final model parameter values determined by the respective worker for the first training session assigned to the respective worker,
      selecting a second training session from the plurality of training sessions,
      selecting, based on comparing the updated training session and the second training session using a fitness evaluation function, either the updated training session or the second training session as a parent training session,
      generating a child training session from the selected parent training session, wherein the generating comprises:
         generating child hyperparameter values of the child training session for training the machine learning model by updating hyperparameter values that have been used to train the machine learning model in the parent training session, and
         generating child model parameters for the child training session by setting the child model parameters using the model parameter values of the parent training session, and
      assigning the child training session to an available worker; and
   selecting a candidate model trained by a worker of the one or more workers to be a trained model for the machine learning model.

2. The method of claim 1, wherein the operations further comprise:
   determining that the one or more termination criteria have been met; and
   in response to determining that the one or more termination criteria have been met, selecting the candidate model trained by the worker of the one or more workers to be the trained model for the machine learning model.

3. The method of claim 1, wherein the one or more termination criteria comprise each training session in the plurality of training sessions having been compared to a respective other training session in the plurality of training sessions.

4. The method of claim 1, further comprising:
   receiving a request for final hyperparameter values used to train the selected candidate model, and
   in response to the request, providing hyperparameter values of a training session used by the worker that trained the selected candidate model.

5. The method of claim 1, wherein the operations further comprise:

maintaining a training session dependency graph, wherein each node of the training session dependency graph corresponds to a respective training session of the plurality of training sessions, and each edge between a pair of nodes in the training session dependency graph corresponds to a training session represented by a first node of the pair of nodes having been generated from another training session represented by a second node of the pair of nodes.

6. The method of claim 5, wherein the plurality of training sessions comprises one or more initial training sessions, wherein the one or more initial training sessions comprise respective hyperparameter values sampled from a first distribution of values, and respective model parameter values sampled from a second distribution of values, and wherein the operations further comprise:

generating a hyperparameter schedule for the selected candidate model, comprising:
- identifying a particular training session assigned to a worker of the one or more workers, wherein the particular training session comprises model parameter values corresponding to model parameter values of the selected candidate model,
- generating a subgraph comprising a node representing the particular training session and respective nodes whose respective edges form a path from the node comprising the node representing the particular training session and a node representing an initial training session of the one or more initial training sessions, and
- obtaining a hyperparameter schedule from respective hyperparameter values of each training session represented by a respective node in the subgraph.

7. The method of claim 1, wherein generating the child training session from the selected parent training session comprises:

generating modified hyperparameter values for the child training session by multiplying respective hyperparameter values of the selected parent training session with a randomly sampled value.

8. The method of claim 1, wherein the one or more processing units are heterogeneous.

9. The method of claim 1, wherein respective final parameter values for each training session request of a plurality of training session requests is represented as a checkpoint software object.

10. The method of claim 1, further comprising:

providing the trained model for use in processing new inputs.

11. A system comprising:

one or more computers and one or more storage devices on which are stored instructions that are operable, when executed by the one or more computers, to cause the one or more computers to perform operations comprising:

maintaining a plurality of training sessions for training a machine learning model, wherein a training session of the plurality of training sessions comprises data defining (i) respective hyperparameter values for training the machine learning model and (ii) model parameter values of the machine learning model, and defines a session during which the machine learning model is trained by repeatedly updating the model parameter values of the machine learning model according to the respective hyperparameter values;

assigning, to each worker of one or more workers, one or more respective training sessions of the plurality of training sessions, each worker comprising one or more processing units to train the machine learning model during the assigned one or more respective training sessions, wherein for each worker of the one or more workers and each of the one or more respective training sessions assigned to the worker, the worker is configured to receive the training session, initialize a respective candidate model with model parameter values defined by the training session, train the respective candidate model starting from the model parameter values of the training session and according to hyperparameter values defined by the training session to determine final model parameter values for the training session, and update the training session by replacing the model parameter values defined by the training session with the final model parameter values determined for the training session;

repeatedly performing operations until meeting one or more termination criteria, the operations comprising:
- receiving an updated training session from a respective worker of the one or more workers, wherein the updated training session identifies a first training session assigned to the respective worker and the final model parameter values determined by the respective worker for the first training session assigned to the respective worker,
- selecting a second training session from the plurality of training sessions,
- selecting, based on comparing the updated training session and the second training session using a fitness evaluation function, either the updated training session or the second training session as a parent training session,
- generating a child training session from the selected parent training session, wherein the generating comprises:
  - generating child hyperparameter values of the child training session for training the machine learning model by updating hyperparameter values that have been used to train the machine learning model in the parent training session, and
  - generating child model parameters for the child training session by setting the child model parameters using the model parameter values of the parent training session, and
- assigning the child training session to an available worker; and selecting a candidate model trained by a worker of the one or more workers to be a trained model for the machine learning model.

12. The system of claim 11, wherein the operations further comprise:

determining that the one or more termination criteria have been met; and in response to determining that the one or more termination criteria have been met, selecting the candidate model trained by the worker of the one or more workers to be the trained model for the machine learning model.

13. The system of claim 11, wherein the one or more termination criteria comprise each training session in the plurality of training sessions having been compared to a respective other training session in the plurality of training sessions.

14. The system of claim 11, wherein the operations further comprise:
   receiving a request for final hyperparameter values used to train the selected candidate model, and
   in response to the request, providing hyperparameter values of a training session used by the worker that trained the selected candidate model.

15. The system of claim 11, wherein the operations further comprise:
   maintaining a training session dependency graph, wherein each node of the training session dependency graph corresponds to a respective training session of the plurality of training sessions, and each edge between a pair of nodes in the training session dependency graph corresponds to a training session represented by a first node of the pair of nodes having been generated from another training session represented by a second node of the pair of nodes.

16. The system of claim 15, wherein the plurality of training sessions comprises one or more initial training sessions, wherein the one or more initial training sessions comprise respective hyperparameter values sampled from a first distribution of values, and respective model parameter values sampled from a second distribution of values, and wherein the operations further comprise:
   generating a hyperparameter schedule for the selected candidate model, comprising:
      identifying a particular training session assigned to a worker of the one or more workers, wherein the particular training session comprises model parameter values corresponding to model parameter values of the selected candidate model,
      generating a subgraph comprising a node representing the particular training session and respective nodes whose respective edges form a path from the node comprising the node representing the particular training session and a node representing an initial training session of the one or more initial training sessions, and
      obtaining a hyperparameter schedule from respective hyperparameter values of each training session represented by a respective node in the subgraph.

17. The system of claim 11, wherein generating the child training session from the selected parent training session comprises:
   generating modified hyperparameter values for the child training session by multiplying respective hyperparameter values of the selected parent training session with a randomly sampled value.

18. The system of claim 11, wherein the one or more processing units are heterogeneous.

19. The system of claim 11, wherein respective final parameter values for each training session request of a plurality of training session requests is represented as a checkpoint software object.

20. The system of claim 11, wherein the operations further comprise:
   providing the trained model for use in processing new inputs.

21. One or more non-transitory computer-readable storage media encoded with instructions that, when executed by one or more computers, cause the one or more computers to perform operations comprising:
   maintaining a plurality of training sessions for training a machine learning model, wherein a training session of the plurality of training sessions comprises data defining (i) respective hyperparameter values for training the machine learning model and (ii) model parameter values of the machine learning model, and defines a session during which the machine learning model is trained by repeatedly updating the model parameter values of the machine learning model according to the respective hyperparameter values;
   assigning, to each worker of one or more workers, one or more respective training sessions of the plurality of training sessions, each worker comprising one or more processing units to train the machine learning model during the assigned one or more respective training sessions,
   wherein for each worker of the one or more workers and each of the one or more respective training sessions assigned to the worker, the worker is configured to receive the training session, initialize a respective candidate model with model parameter values defined by the training session, train the respective candidate model starting from the model parameter values of the training session and according to hyperparameter values defined by the training session to determine final model parameter values for the training session, and update the training session by replacing the model parameter values defined by the training session with the final model parameter values determined for the training session;
   repeatedly performing operations until meeting one or more termination criteria, the operations comprising:
      receiving an updated training session from a respective worker of the one or more workers, wherein the updated training session identifies a first training session assigned to the respective worker and the final model parameter values determined by the respective worker for the first training session assigned to the respective worker,
      selecting a second training session from the plurality of training sessions,
      selecting, based on comparing the updated training session and the second training session using a fitness evaluation function, either the updated training session or the second training session as a parent training session,
      generating a child training session from the selected parent training session, wherein the generating comprises:
         generating child hyperparameter values of the child training session for training the machine learning model by updating hyperparameter values that have been used to train the machine learning model in the parent training session, and
         generating child model parameters for the child training session by setting the child model parameters using the model parameter values of the parent training session, and
      assigning the child training session to an available worker; and
   selecting a candidate model trained by a worker of the one or more workers to be a trained model for the machine learning model.

22. The computer-readable storage media of claim 21, wherein the operations further comprise:
   determining that the one or more termination criteria have been met; and
   in response to determining that the one or more termination criteria have been met, selecting the candidate model trained by the worker of the one or more workers to be the trained model for the machine learning model.

23. The computer-readable storage media of claim 21, wherein the one or more termination criteria comprise each training session in the plurality of training sessions having been compared to a respective other training session in the plurality of training sessions.

24. The computer-readable storage media of claim 21, wherein the operations further comprise:
    receiving a request for final hyperparameter values used to train the selected candidate model, and
    in response to the request, providing hyperparameter values of a training session used by the worker that trained the selected candidate model.

25. The computer-readable storage media of claim 21, wherein the operations further comprise:
    maintaining a training session dependency graph, wherein each node of the training session dependency graph corresponds to a respective training session of the plurality of training sessions, and each edge between a pair of nodes in the training session dependency graph corresponds to a training session represented by a first node of the pair of nodes having been generated from another training session represented by a second node of the pair of nodes.

26. The computer-readable storage media of claim 25, wherein the plurality of training sessions comprises one or more initial training sessions, wherein the one or more initial training sessions comprise respective hyperparameter values sampled from a first distribution of values, and respective model parameter values sampled from a second distribution of values, and wherein the operations further comprise:
    generating a hyperparameter schedule for the selected candidate model, comprising:
        identifying a particular training session assigned to a worker of the one or more workers, wherein the particular training session comprises model parameter values corresponding to model parameter values of the selected candidate model,
        generating a subgraph comprising a node representing the particular training session and respective nodes whose respective edges form a path from the node comprising the node representing the particular training session and a node representing an initial training session of the one or more initial training sessions, and
        obtaining a hyperparameter schedule from respective hyperparameter values of each training session represented by a respective node in the subgraph.

27. The computer-readable storage media of claim 21, wherein generating the child training session from the selected parent training session comprises:
    generating modified hyperparameter values for the child training session by multiplying respective hyperparameter values of the selected parent training session with a randomly sampled value.

28. The computer-readable storage media of claim 21, wherein the one or more processing units are heterogeneous.

29. The computer-readable storage media of claim 21, wherein respective final parameter values for each training session request of a plurality of training session requests is represented as a checkpoint software object.

30. The computer-readable storage media of claim 21, wherein the operations further comprise:
    providing the trained model for use in processing new inputs.

* * * * *